(12) United States Patent
Takeda et al.

(10) Patent No.: US 11,088,790 B2
(45) Date of Patent: Aug. 10, 2021

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/753,197

(22) PCT Filed: Aug. 12, 2016

(86) PCT No.: PCT/JP2016/073796
§ 371 (c)(1),
(2) Date: Feb. 16, 2018

(87) PCT Pub. No.: WO2017/033778
PCT Pub. Date: Mar. 2, 2017

(65) Prior Publication Data
US 2018/0241518 A1    Aug. 23, 2018

(30) Foreign Application Priority Data
Aug. 21, 2015  (JP) .............................. JP2015-164187

(51) Int. Cl.
*H04L 5/00* (2006.01)
*H04W 72/04* (2009.01)
(Continued)

(52) U.S. Cl.
CPC .............. *H04L 5/001* (2013.01); *H04B 7/00* (2013.01); *H04L 5/0051* (2013.01);
(Continued)

(58) Field of Classification Search
CPC .......... H04L 5/00; H04W 72/04; H04W 24/08
See application file for complete search history.

(56) References Cited

U.S. PATENT DOCUMENTS 8,873,362 B2    10/2014  Papasakellariou et al.
9,048,976 B2 *   6/2015  Noh ...................... H04L 5/0048
(Continued)

FOREIGN PATENT DOCUMENTS

JP    2013-515427 A    5/2013
WO    2014/089782 A1   6/2014

OTHER PUBLICATIONS

Extended European Search Report issued in corresponding European Application No. 16839125.8, dated Nov. 22, 2018 (10 pages).
(Continued)

*Primary Examiner* — Rasheed Gidado
(74) *Attorney, Agent, or Firm* — Osha Bergman Watanabe & Burton LLP

(57) ABSTRACT

According to the present invention, a radio base station uses a measurement reference signal transmitted from a user terminal to carry out a measurement with a sufficient precision. According to an embodiment, a user terminal is configured to apply orthogonal frequency division multiple access (OFDMA) in an uplink, the user terminal including a generating section configured to generate a measurement reference signal used for carrying out a measurement in a radio base station; a mapping section configured to map the measurement reference signal to a radio resource that is discontinuous in a time direction and/or a frequency direction; and a transmitting section configured to transmit the measurement reference signal to the radio base station.

5 Claims, 13 Drawing Sheets

(51) Int. Cl.
*H04W 24/08* (2009.01)
*H04B 7/00* (2006.01)
*H04L 27/26* (2006.01)
*H04W 88/06* (2009.01)

(52) U.S. Cl.
CPC ......... *H04L 27/2611* (2013.01); *H04W 24/08* (2013.01); *H04W 72/048* (2013.01); *H04L 5/0021* (2013.01); *H04L 5/0023* (2013.01); *H04L 5/0044* (2013.01); *H04W 88/06* (2013.01)

(56) References Cited

U.S. PATENT DOCUMENTS

| | | | | |
|---|---|---|---|---|
| 10,305,660 | B2* | 5/2019 | Seol | H04W 72/044 |
| 2006/0035643 | A1 | 2/2006 | Vook et al. | |
| 2010/0014481 | A1* | 1/2010 | Ko | H04L 5/0048 |
| | | | | 370/330 |
| 2010/0020702 | A1* | 1/2010 | Wong | H04L 41/5009 |
| | | | | 370/252 |
| 2010/0104034 | A1* | 4/2010 | Nam | H04L 5/0007 |
| | | | | 375/260 |
| 2010/0135242 | A1* | 6/2010 | Nam | H04L 5/0007 |
| | | | | 370/330 |
| 2011/0103343 | A1* | 5/2011 | Nishio | H04W 72/10 |
| | | | | 370/330 |
| 2011/0164489 | A1* | 7/2011 | Papasakellariou | H04W 72/0413 |
| | | | | 370/203 |
| 2011/0275396 | A1* | 11/2011 | Nishio | H04B 7/0615 |
| | | | | 455/509 |
| 2012/0014349 | A1* | 1/2012 | Chung | H04B 7/0684 |
| | | | | 370/329 |
| 2013/0163507 | A1* | 6/2013 | Hoshino | H04B 7/155 |
| | | | | 370/315 |
| 2013/0170466 | A1* | 7/2013 | Nishio | H04L 5/0007 |
| | | | | 370/329 |
| 2013/0329660 | A1* | 12/2013 | Noh | H04L 5/0048 |
| | | | | 370/329 |
| 2015/0223231 | A1* | 8/2015 | Noh | H04W 48/00 |
| | | | | 370/329 |
| 2015/0319718 | A1* | 11/2015 | Yang | H04W 76/15 |
| | | | | 370/252 |
| 2018/0083752 | A1* | 3/2018 | Kim | H04W 72/1268 |
| 2018/0212733 | A1* | 7/2018 | Khoryaev | H04L 5/0051 |

OTHER PUBLICATIONS

International Search Report of the International Searching Authority issued in PCT/JP2016/073796 dated Oct. 25, 2016 (2 pages).
Written Opinion of the International Searching Authority issued in PCT/JP2016/073796 dated Oct. 25, 2016 (4 pages).
3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2008 (126 pages).
Notice of Reasons for Refusal issued in Japanese Application No. 2017-536752, dated Oct. 6, 2020 (6 pages).

* cited by examiner

| Value of SRS request field | Description |
|---|---|
| 00 | No eSRS trigger |
| 01 | The 1st eSRS parameter set configured by higher layers |
| 10 | The 2nd eSRS parameter set configured by higher layers |
| 11 | The 3rd eSRS parameter set configured by higher layers |

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purposes of further increasing high-speed data rates and providing low delay, etc. (non-patent literature 1). Furthermore, for the purpose of achieving further broadbandization and higher speed, successor systems to LTE (known as, e.g., LTE-A (LTE advanced), FRA (Future Radio Access), and 5G ($5^{th}$ Generation Mobile Communication System), etc.) have also been studied.

In future radio communication systems (e.g., 5G), due to their use for mobile broadband, it is assumed that there will be a demand for further increases in speed and volume, while being required to reduce delay and deal with the connecting of a large volume of devices. Furthermore, in order to achieve a further increase in speed and volume, it is also envisaged that an even broader bandwidth of the frequency spectrum will be utilized.

In addition, in LTE up to Rel. 12, a sounding reference signal (SRS) is prescribed as a measurement reference signal for measurement use in a radio base station. An SRS is used for measuring transmission quality in an uplink (UL), or is used for measuring a channel state of a downlink (DL) that utilizes channel reciprocity in time division duplex (TDD).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".

SUMMARY OF INVENTION

Technical Problem

In future radio communication systems such as 5G, etc., the application of FD-MIMO (Full Dimension Multiple Input Multiple Output) (also called Massive MIMO, etc.), which controls beams aimed at user terminals using a large volume of antenna elements, has also been studied. In FD-MIMO, the user terminal is required to measure the channel state of the downlink with high precision and feedback to the radio base station. On the other hand, when the user terminal tries to feedback high precision channel state information, there is a risk of the feedback information amount becoming too large.

Consequently, the radio base station using an existing SRS to carry out a measurement that utilizes channel reciprocity between the uplink and the downlink and carrying out beam control in FD-MIMO based on the measurement result is also being studied. However, in the case where an existing SRS is used, it is conceivable that measurement cannot be carried out at a sufficient precision for obtaining channel reciprocity.

The present invention has been devised in view of the above problems, and it is an object of the present invention to provide a user terminal, a radio base station and a radio communication method, in a future radio communication system, which can transmit a measurement reference signal, by which measurement in a radio base station can be carried out with sufficient precision.

Solution to Problem

According to the user terminal of the present invention, a user terminal is configured to apply orthogonal frequency division multiple access (OFDMA) in an uplink, the user terminal including a generating section configured to generate a measurement reference signal used for carrying out a measurement in a radio base station; a mapping section configured to map the measurement reference signal to a radio resource that is discontinuous in a time direction and/or frequency direction; and a transmitting section configured to transmit the measurement reference signal to the radio base station.

Technical Advantageous of Invention

According to the present invention, a radio base station can carry out measurement with sufficient precision by using a measurement reference signal that is transmitted from a user terminal.

DESCRIPTION OF EMBODIMENTS

FIG. 1 shows an example of a sounding reference signal (SRS) in LTE Rel. 8 through 12. An SRS is a measurement reference signal used for carrying out measurement by a radio base station, and is used in, for example, measurement of transmission quality in an uplink, or measurement of a downlink channel state by utilizing channel reciprocity.

SRS includes periodic SRS, in which a user terminal transmits an SRS at a predetermined period that is set by higher layer signaling, and aperiodic SRS, in which the user terminal transmits an SRS if instructed by physical layer signaling.

Figure 1A:
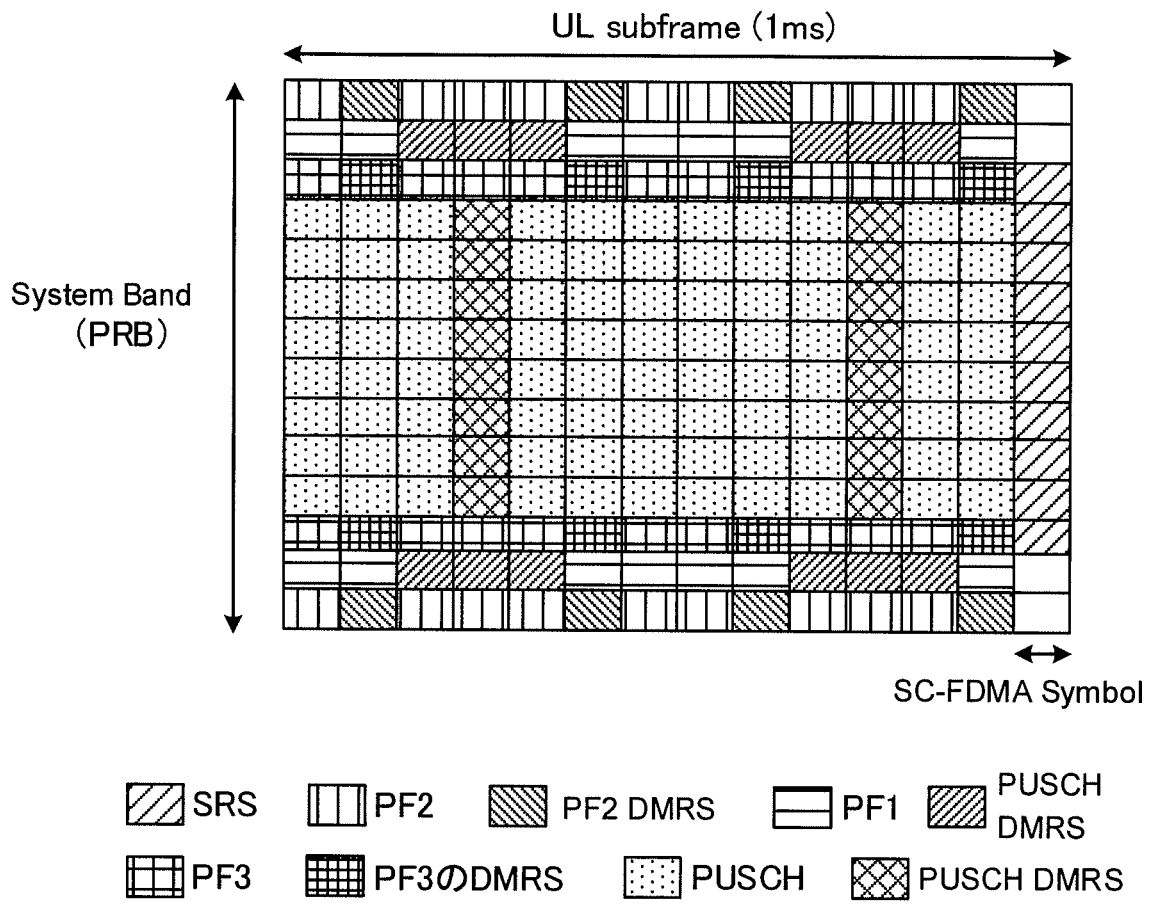
FIGS. 1A and 1B are diagrams showing an example of an SRS.

FIG. 1A shows an example of a subframe (SRS subframe) transmitted by an SRS (a periodic SRS or an aperiodic SRS). As shown in FIG. 1A, from outside the system band frequency, PUCCH format 2 (2a/2b) used in the transmission of channel state information (CSI), PUCCH format 1 (2a/2b) used in the transmission of a delivery acknowledgement signal (HARQ-ACK), PUCCH format 3 used in the transmission of delivery acknowledgement information for up to 5 component carriers (CCs), PUSCH, each PUCCH format, and PUSCH demodulation reference signal (DMRS) are mapped to the SRS subframe except for the last SC-FDMA (Single Carrier-Frequency Division Multiple Access) symbol thereof.

Whereas, in the last SC-FDMA symbol of the SRS subframe, the SRS is mapped across the system band frequency, whereas the PUCCH and the PUSCH are not mapped thereto. Note that in the case of TDD, transmission of an SRS is also possible in a UpPTS (Uplink Pilot Time Slot) of a special subframe for switching between the downlink subframe and the uplink subframe. The UpPTS is configured of a maximum of 2 SC-FDMA symbols. In the UpPTS, it is also possible to transmit an SRS in 2 SC-FDMA symbols in succession.

Furthermore, in the SRS, a CAZAC (Constant Amplitude Zero Auto-Correlation) sequence is employed. A CAZAC sequence is an orthogonal spreading sequence that uses cyclic shift, the PAPR (Peak to Average Power Ratio) is small, and has a small auto-correlation.

Figure 1B:
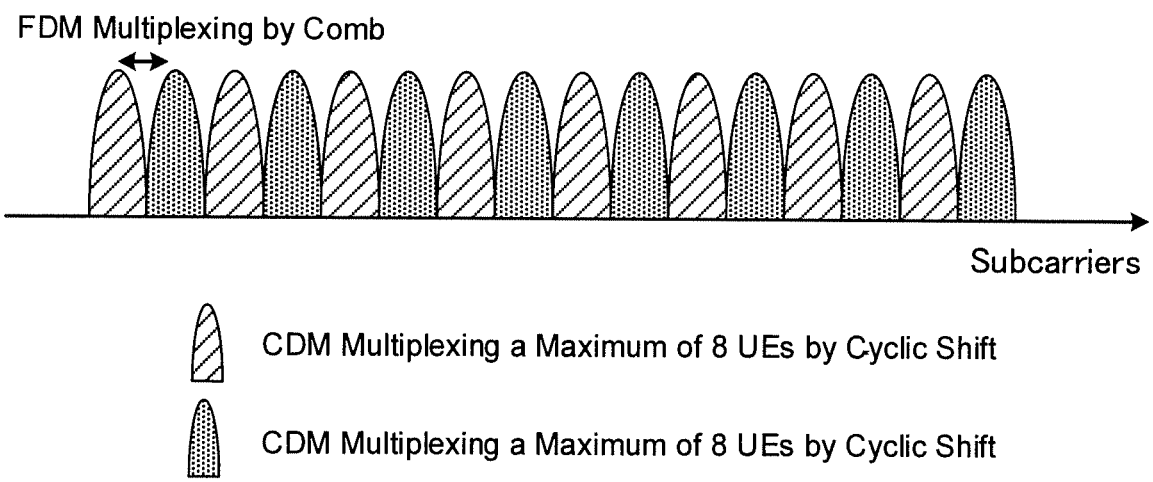

Furthermore, as shown in FIG. 1B, SRSs of a maximum of two user terminals are orthogonal frequency division multiplexed by using comb subcarrier allocation. Furthermore, by using the cyclic shift of a CAZAC sequence within each comb, SRSs for a maximum of eight user terminals are code-division multiplexed in each comb.

In future radio communication systems such as 5G, etc., FD-MIMO (also called Massive MIMO, etc.), which controls beams aimed at user terminals using a large volume of antenna elements, has also been studied. In FD-MIMO, the user terminal is required to measure the channel state of the downlink with high precision and feedback to the radio base station. On the other hand, when the user terminal tries to feedback high precision channel state information, there is a risk of the feedback information amount becoming too large.

Consequently, the radio base station using an existing SRS to carry out a measurement that utilizes channel reciprocity between the uplink and the downlink and carrying out beam control in FD-MIMO based on the measurement result is also being studied. However, in the case where an existing SRS is used, it is envisaged that measurement cannot be carried out at a sufficient precision for obtaining channel reciprocity.

Specifically, since an SRS normally can only be transmitted in the last SC-FDMA symbol (1 symbol) of a subframe (see FIG. 1A), the measurement precision cannot be increased. Furthermore, since the SRSs of a plurality of user terminals that are code-division multiplexed by a cyclic shift within the same comb are not completely orthogonal, interference between user terminals cannot be removed. Furthermore, since the measurement result of the reception SINR of the SRS includes uplink interference from another cell, the SINR measurement result is not the same as the downlink propagation channel conditions.

Hence, it is assumed that an existing SRS is not suitable for the case where measurement in the radio base station is required to be carried out at a high precision. Accordingly, in a future radio communication system, a measurement reference signal that can carry out high precision measurement in a radio base station, instead of an existing SRS, is desired.

However, in a future radio communication system, in order to increase the frequency usage efficiency of the uplink, employment of orthogonal frequency division multiple access (OFDMA) (also called "UL-OFDMA") in the uplink is being studied, instead of SC-FDMA (or also called "DFT (Discrete Fourier Transform) spread OFDM") that is employed in LTE up to Rel. 12.

In UL-OFDMA, since inverse fourier transform (IFFT: Inverse FTT) is carried out on the generated signal rather than discrete fourier transform (DFT), the mapping of the signal is carried out in the frequency domain. Therefore, in UL-OFDMA, unlike with existing SRSs, it is also possible to allocate an uplink reference signal in a discontinuous subcarrier within the same OFDM (Orthogonal Frequency Division Multiplexing) symbol. Accordingly, since restrictions on the allocation resources of the uplink reference signal are reduced in UL-OFDMA, it is possible to increase the number of allocations of the uplink reference signal.

Consequently, in the case where UL-OFDMA is applied, the inventors of the present invention arrived at the present invention upon conception of the idea of improving the precision of measurement in the radio base station, compared to when existing SRSs are used, by flexibly mapping a measurement reference signal, which are used for measurement in the radio base station.

Specifically, according to an embodiment of the present invention, a user terminal which applies UL-OFDMA generates a measurement reference signal used for measurement in a radio base station. Furthermore, the user terminal maps a measurement reference signal to discontinuous resources in the time direction and/or in the frequency direction, and transmits the mapped measurement reference signal to the radio base station.

Hereinbelow, a description is given in regard to a radio communication method according to a first embodiment of the present invention. The following descriptions assume that the UL-OFDMA is applied to the user terminal and the radio base station. Furthermore, in the following descriptions, the measurement reference signal used for measurement in the radio base station has been termed as an "eSRS" (enhanced Sounding Reference Signal), however, the name therefor is not limited to "eSRS".

Furthermore, in the following descriptions, higher layer signaling includes RRC (Radio Resource Control) signaling and broadcast information. Furthermore, physical layer signaling includes a layer 1/layer 2 (L1/L2) control signal such as a PDCCH (Physical Downlink Control Channel) or an EPDCCH (Enhanced PDCCH), etc.

In the following descriptions, PUSCH is used as an example of an uplink data signal, PUCCH is used as an example of an uplink control signal, PDSCH is used as an example of a downlink data signal, and PDCCH/EPDCCH is used as an example of a downlink control signal (L1/L2 control signal), however, the names thereof are not limited thereto.

First Embodiment

In the first embodiment, an example of generation and mapping of an eSRS will be described. In the first embodiment, the user terminal generates an eSRS (measurement reference signal) for use in carrying out measurement in the radio base station, and the eSRS is mapped to discontinuous resources (e.g., subcarriers, resource blocks (a PRB: Physical Resource Block), OFDM symbols, or a subframe, etc.) in the time direction and/or in the frequency direction.

Specifically, likewise with an existing SRS, the user terminal may use a CAZAC (Constant Amplitude Zero Auto-Correlation) sequence to generate an eSRS sequence, or may use a sequence other than a CAZAC sequence to generate an eSRS sequence. For example, an eSRS sequence may be a sequence generated by masking a PN (Pseudo-Noise) sequence using a cell ID or a pseudo-cell ID, or the eSRS sequence may be a sequence that is PSK (Phase Shift Keying) modulated (e.g., BPSK (Binary PSK) or QPSK (Quadrature PSK)) sequence, etc.

Note that information (e.g., the above-mentioned cell ID) used in the generation of the eSRS sequence may be notified to the user terminal via higher layer signaling or physical layer signaling.

Furthermore, the user terminal may multiplex its eSRS with an eSRS of another user terminal within the same cell by orthogonal multiplexing (subcarrier shift) in the frequency domain or by orthogonal multiplexing that uses orthogonal cover code (OCC).

Figure 2A:
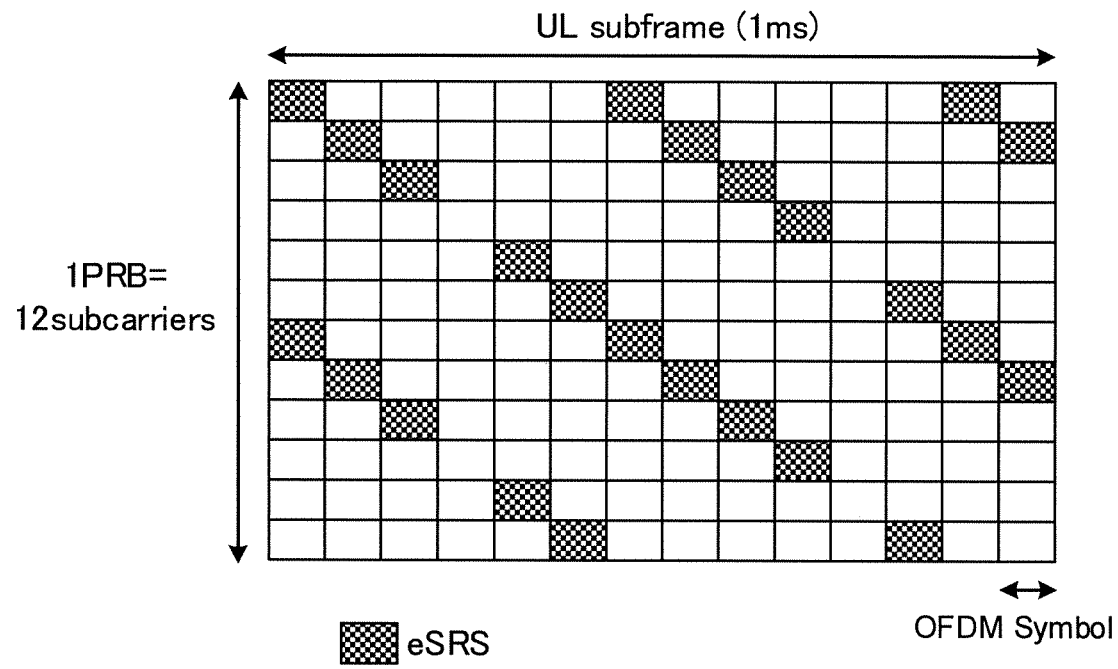
FIGS. 2A and 2B are illustrative diagrams of an example of mapping an eSRS, pertaining to a first embodiment.

FIG. 2 shows mapping examples of an eSRS. In FIG. 2A, the user terminal maps an eSRS in subcarriers that are shifted between OFDM symbols so that the eSRS is mapped to all the subcarriers within a PRB. Note that in FIG. 2A, the eSRS is not mapped to the $4^{th}$ and $11^{th}$ OFDM symbols, from the left, since it is assumed that a PUSCH DM-RS will be allocated over all the subcarriers thereat. In the case where the eSRS and the PUSCH are not transmitted (multiplexed) in the same subframe, the eSRS may be mapped to the $4^{th}$ and $11^{th}$ OFDM symbols, from the left. By increasing the eSRS mapping symbols, the sounding measuring precision can be improved. Alternatively, a configuration is possible, in which the eSRS is not mapped to the $4^{th}$ and $11^{th}$ OFDM symbols, from the left, regardless of whether or not the eSRS and the PUSCH are transmitted in the same subframe. This is due to it being desirable for the DM-RS not to overlap with other signals such as the eSRS, etc., in order for the DM-RS between user terminals to appropriately orthogonally divide, assuming the case where PUSCHs transmitted from a plurality of user terminals in the same PRB are spatial multiplexed. Furthermore, although the example shown is that of the case where the DM-RS is allocated in all of the subcarriers in the $4^{th}$ and $11^{th}$ OFDM symbols, from the left, the above-described control is valid regardless of the DM-RS allocation pattern.

In FIG. 2A, since the subcarriers to which the eSRS is mapped are shifted per OFDM symbol, measurement of all the subcarriers in one subframe can be carried out. Furthermore, since the eSRS are mapped to all of the eSRS-mappable OFDM symbols, the overhead between OFDM symbols can be made constant.

Figure 2B:
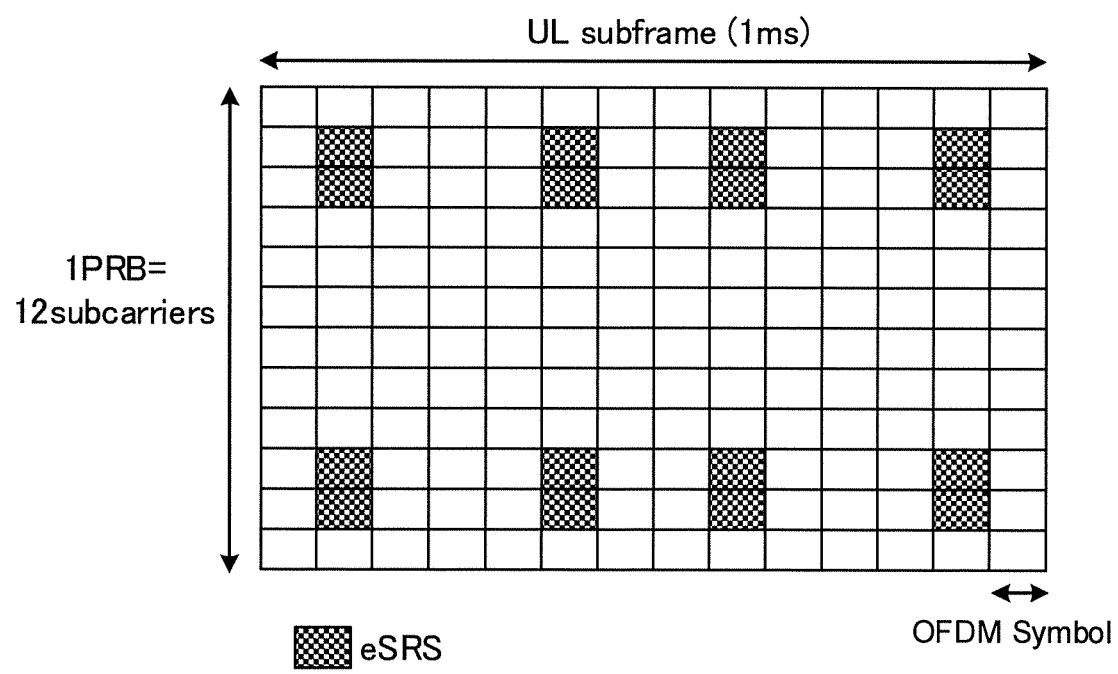

In FIG. 2B, the user terminal maps the eSRS to some of the subcarriers (two groups of two continuous subcarriers in this example) within the resource block in specified OFDM symbols (four discontinuous OFDM symbols). Furthermore, in FIG. 2B, although the eSRS has been mapped to the same subcarriers between the specified OFDM symbols, the present embodiment is not limited thereto.

In FIG. 2B, since the OFDM symbols to which the eSRS is mapped are limited, the power consumption of the user terminal pertaining to the transmission of the eSRS can be reduced compared to that of FIG. 2A. Furthermore, since the eSRS is mapped to the same subcarriers between specified OFDM symbols, the change in the channel state in the same subcarriers can be measured.

Second Embodiment

In the second embodiment, an example of mapping of an eSRS and a PUSCH will be described. In the second embodiment, the user terminal maps the eSRS and the PUSCH (uplink data signal) to the same OFDM symbols, and transmits to the radio base station. It is possible to combine the second embodiment with the first embodiment; hereinbelow, the aspects that are different from the first embodiment will be discussed.

Figure 3A:
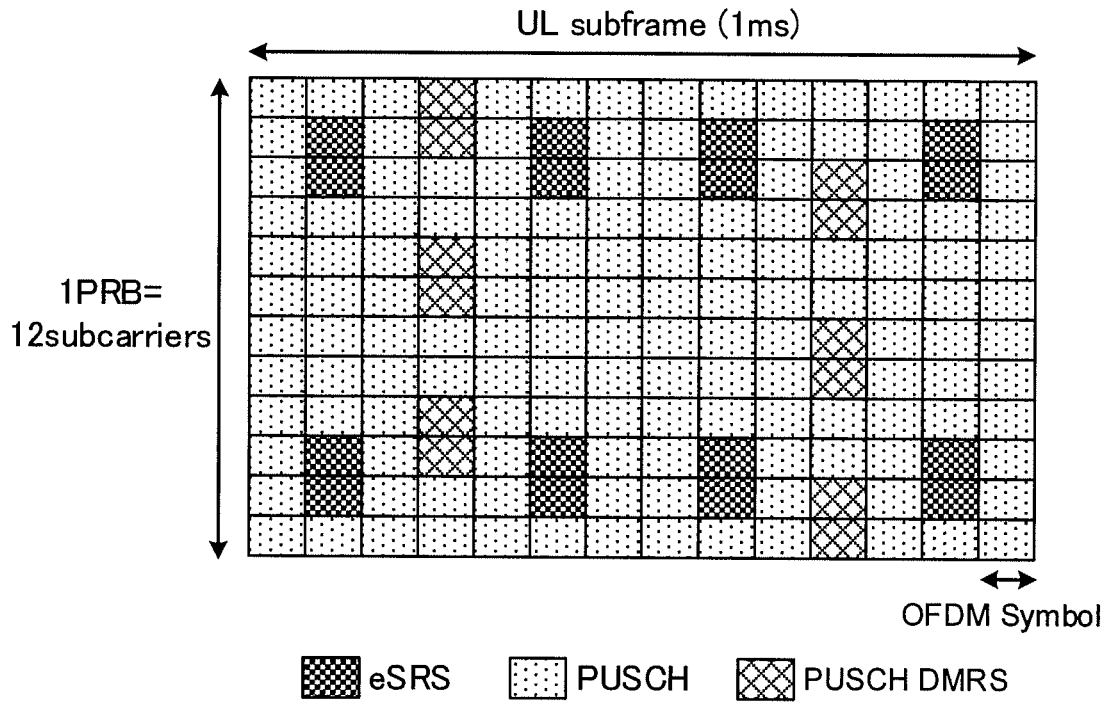
FIGS. 3A and 3B are illustrative diagrams of an example of a physical layer configuration of an eSRS, pertaining to a second embodiment.

FIG. 3 shows an example of mapping of an eSRS and a PUSCH. Note that in FIG. 3A, the eSRS is mapped in the same manner as in FIG. 2B, however, the eSRS may be mapped as shown in FIG. 2A, or may be mapped in another pattern other than those of FIGS. 2A and 2B. Furthermore, the PUSCH DM-RS allocation example is not limited thereto.

As shown in FIG. 3A, in the case where the eSRS and the PUSCH are mapped within the same PRB, the user terminal punctures or rate-matches the PUSCH based on the radio resources (e.g., the resource element number) to which the eSRS is mapped. Specifically, in the case where the user terminal punctures the PUSCH, the user terminal encodes the uplink data at a predetermined code rate of that of the case where there is no eSRS, and punctures or repeats the encoding bit sequence so that the encoded bit number is equal to the payload. Furthermore, the user terminal maps the PUSCH to the resource elements to which the DMRS cannot be allocated, and thereafter, the PUSCH resource elements are switched at the eSRS. Whereas, in the case of rate-matching the PUSCH, the user terminal encodes the uplink data at a predetermined code rate, and punctures or repeats the encoding bit sequence so that the encoded bit number is equal to the payload. Furthermore, the user terminal maps the PUSCH to the resource elements to which the eSRS and the DMRS cannot be allocated.

In this manner, in the case where the eSRS and the PUSCH are transmitted in the same PRB, the user terminal receives, from the radio base station, an L1/L2 control signal (e.g., a UL grant) that allocates (grants) a PUSCH. Allocation PRB information that indicates the PRB that is allocated to the PUSCH (hereinafter, "allocated PRB") is included in the L1/L2 control signal.

Furthermore, information in regard to eSRS resource allocation may be included in the L1/L2 control signal; wherein, the information in regard to eSRS resource allocation (scheduling information) may indicate at least one of whether or not to transmit the eSRS, the allocated PRB for the eSRS, the OFDM symbols to which the eSRS is allocated, the eSRS sequence, and the orthogonal encoding index of the eSRS sequence.

Figure 3B:
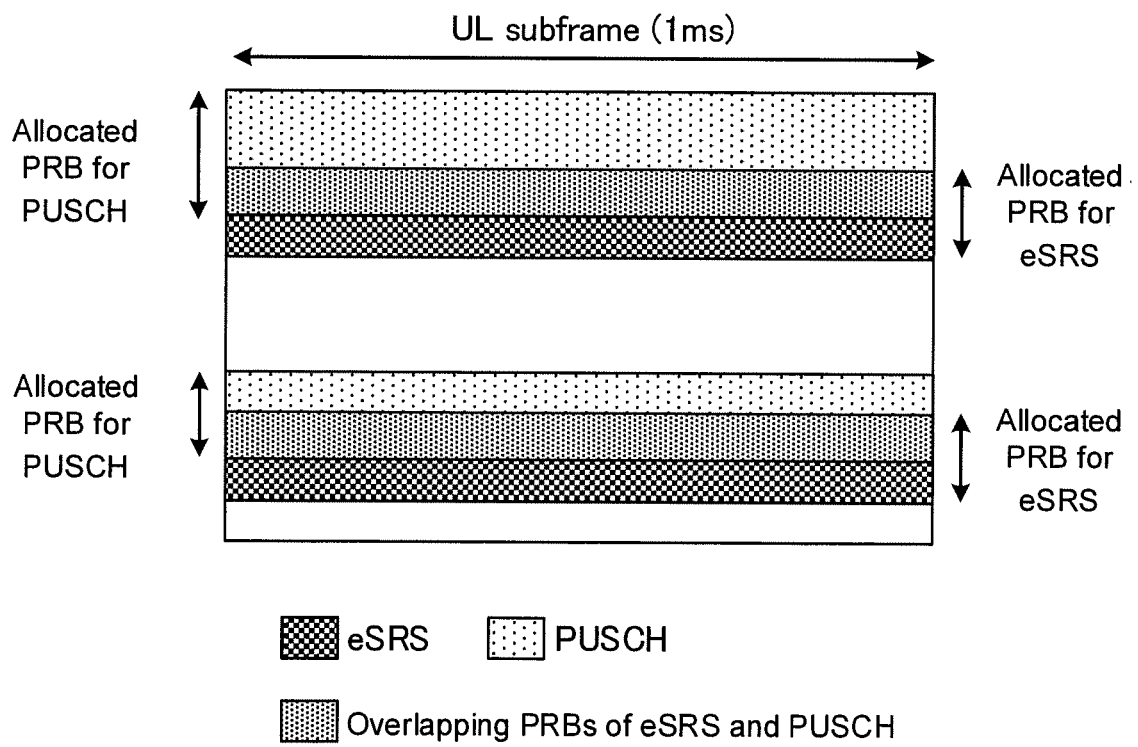

FIG. 3B indicates the allocated PRBs for the eSRS and the PUSCH in the system band. As shown in FIG. 3B, the allocated PRB for the eSRS may be different to the allocated PRB for the PUSCH. Furthermore, as shown in FIG. 3B, the allocated PRB for the eSRS may overlap with part of the allocated PRB for the PUSCH. Note that, although not shown in the drawings, the allocated PRB for the eSRS may completely overlap the allocated PRB for the PUSCH (may be included in the allocated PRB of the PUSCH), or may be the same.

In this manner, if at least part of the allocated PRB for the eSRS overlaps with the allocated PRB of PUSCH, the user terminal may carry out puncturing or rate-matching of the PUSCH only on the overlapping PRB.

Third Embodiment

In the third embodiment, an example of mapping of an eSRS and a PUSCH will be described. In the third embodiment, the user terminal maps the eSRS and the PUSCH (uplink control signal) to the same OFDM symbol, and transmits to the radio base station. It is possible to combine the third embodiment with the first embodiment; hereinbelow, the aspects that are different from the first embodiment will be discussed.

Figure 4A:
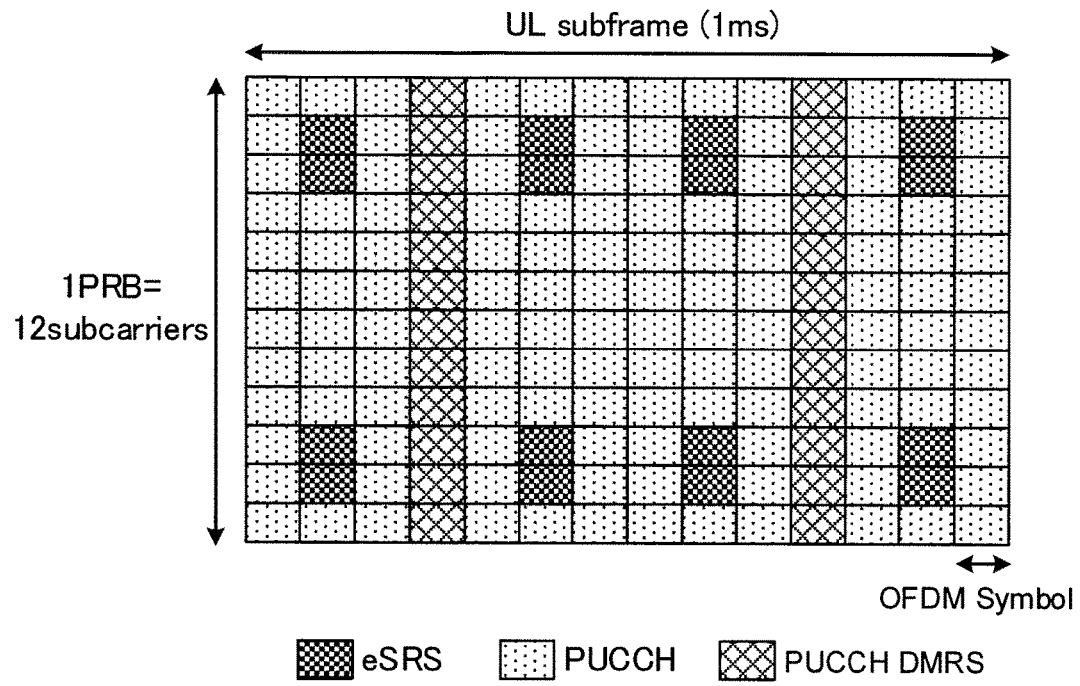
FIGS. 4A and 4B are illustrative diagrams of an example of a physical layer configuration of an eSRS, pertaining to a third embodiment.

FIG. 4 shows an example of mapping of an eSRS and a PUSCH. Note that in FIG. 4A, eSRS is mapped in the same manner as in FIG. 2B, however, the eSRS may be mapped as shown in FIG. 2A, or may be mapped in another pattern other than those of FIGS. 2A and 2B. Furthermore, the PUSCH DM-RS allocation example is not limited thereto.

As shown in FIG. 4A, in the case where the eSRS and the PUSCH are mapped within the same PRB, the user terminal punctures or rate-matches the PUSCH based on the radio resources (e.g., the resource element number) to which the eSRS is mapped. Specifically, the user terminal encodes uplink control information (UCI) at a predetermined code rate, and punctures or repeats the encoding bit sequence so that the encoded bit number is equal to the payload. In the case where puncturing is applied, the user terminal maps the PUSCH to the resource elements to which the DMRS cannot be allocated, and the PUSCH resource elements are switched at the eSRS. In the case where rate-matching is applied, the user terminal maps the PUSCH to the resource elements to which the eSRS and the DMRS cannot be allocated.

In this manner, in the case where the eSRS and the PUSCH are transmitted in the same PRB, the user terminal receives, from the radio base station, an L1/L2 control signal (e.g., a DL assignment) that instructs the transmission of the PUCCH. In the case where a PDSCH is allocated by the L1/L2 control signal, it is required for the delivery acknowledgement information (HARQ-ACK) for the PDSCH to use a PUCCH to be transmitted. Therefore, it can be said that the DL assignment that allocates the PDSCH is a type of L1/L2 control signal for instructing the transmission of the PUCCH. The L1/L2 control signal may include information regarding the above-mentioned eSRS resource allocation (refer to the second embodiment).

Figure 4B:
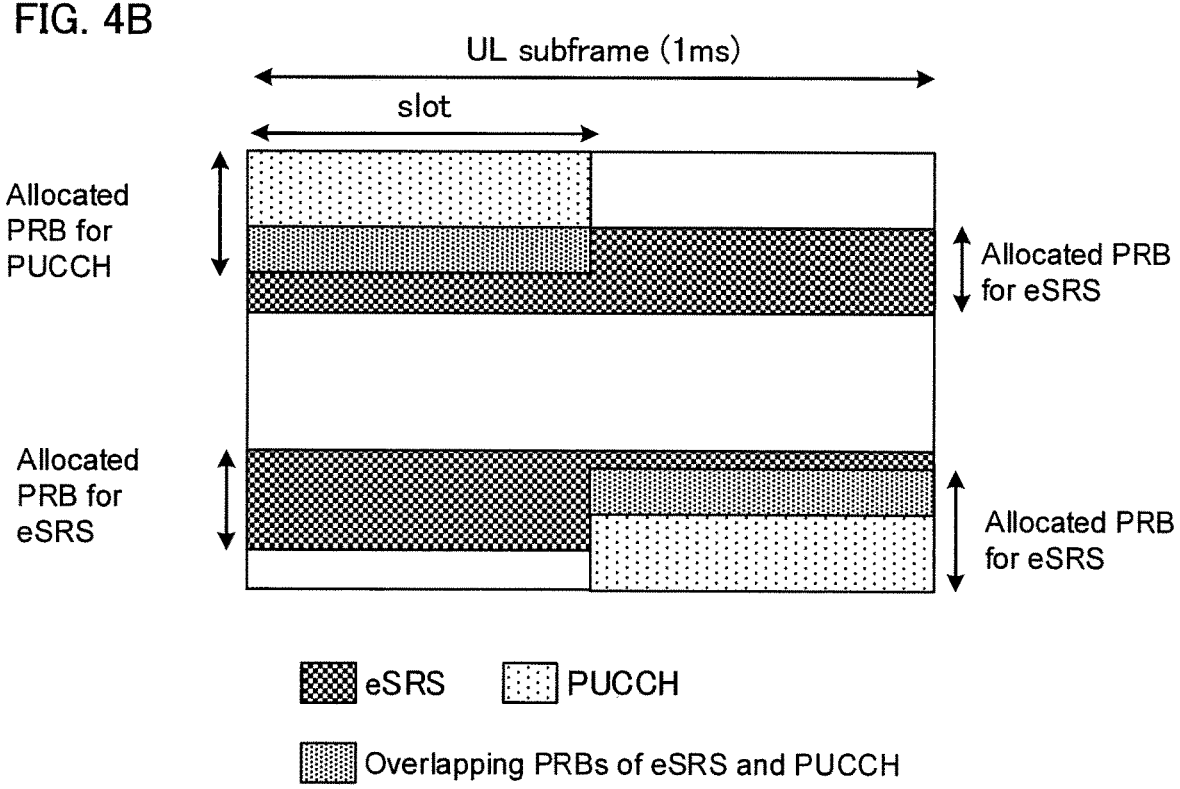

FIG. 4B indicates the allocated PRBs for the eSRS and the PUCCH in the system band. As shown in FIG. 4B, the allocated PRB for the eSRS may be different to the allocated PRB for the PUCCH. Furthermore, as shown in FIG. 4B, the allocated PRB for the eSRS may overlap with part of the allocated PRB for the PUCCH. Note that, although not shown in the drawings, the allocated PRB for the eSRS may completely overlap the allocated PRB for the PUCCH (may be included in the allocated PRB of the PUCCH), or may be the same. Furthermore, the configuration of the PUCCH is not limited to that shown in FIG. 4.

In this manner, if at least part of the allocated PRB for the eSRS overlaps with the allocated PRB of PUCCH, the user terminal may carry out puncturing or rate-matching of the PUCCH only on the overlapping PRB.

Fourth Embodiment

In the fourth embodiment, a detailed description is given of notification examples of information in regard to eSRS resource allocation. As described in the second and third embodiments, the information in regard to eSRS resource allocation may indicate at least one of whether or not to transmit the eSRS, the allocated PRB for the eSRS, the OFDM symbols to which the eSRS is allocated, and the eSRS sequence.

Specifically, descriptions will be given in regard to a first notification example, which uses both higher layer signaling (e.g., RRC signaling or broadcast information) and an L1/L2 control signal (e.g., PDCCH/EPDCCH), and a second notification example, which uses an L1/L2 control signal. The first and second notifications can respectively combine the first through third embodiments.

First Notification Example

In the first notification example, the user terminal configures at least one candidate resource for the eSRS by higher layer signaling. The user terminal receives an L1/L2 control signal that includes trigger information which triggers a radio resource selected from the configured at least one candidate resource. The user terminal uses the radio resource that is designated by the trigger information to transmit the eSRS.

Figures 5A, 5B:
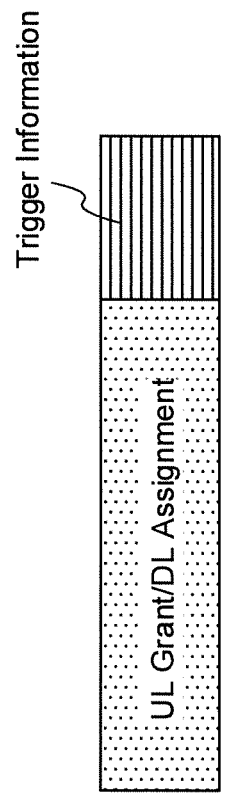
FIGS. 5A and 5B are illustrative diagrams of a first notification example of resource allocation of an eSRS, pertaining to a fourth embodiment.

FIG. 5 is an illustrative diagram of eSRS trigger information included in the L1/L2 control signal. In FIG. 5A, three candidate resources ($1^{st}$ through $3^{rd}$ eSRS parameter set) are configured in the user terminal via higher layer signaling. The user terminal uses the candidate resources indicated by the trigger information to transmit the eSRS. Note that FIG. 5A shows 2-bit trigger information, however, the trigger information is not limited thereto. For example, in the case of 1 bit, one is triggered out of one candidate resource that is configured by higher layer signaling.

Furthermore, as shown in FIG. 5B, the trigger information may be included in the L1/L2 control signal which instructs the transmission of the PUSCH (e.g., a UL grant), or may be included in the L1/L2 control signal which instructs the transmission of the PUCCH (e.g., a DL assignment). As described above, since transmission via a PUCCH of the delivery acknowledgement information (HARQ-ACK) for the PDSCH, using the DL assignment, is required, it can be said that the DL assignment is a type of L1/L2 control signal for instructing the transmission of the PUCCH.

Second Notification Example

In the second notification example, the allocation resource for the eSRS is designated by an L1/L2 control signal. Specifically, the user terminal receives an L1/L2 control signal that includes information regarding resource allocation of the eSRS (eSRS allocation information).

Figure 6A:
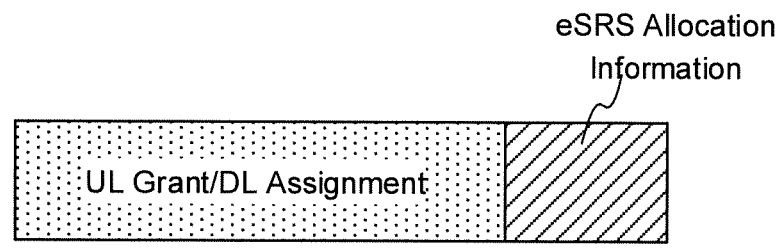
FIGS. 6A and 6B are illustrative diagrams of a second notification example of resource allocation of an eSRS, pertaining to the fourth embodiment.
Figure 6B:
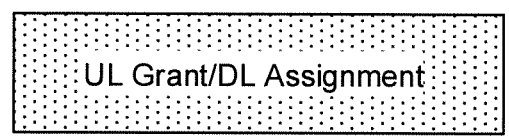
Figure 6B:
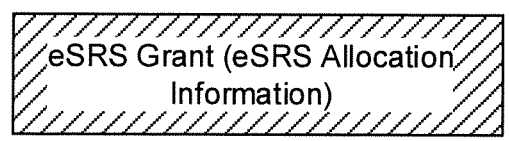

FIG. 6 is an explanatory diagram of an L1/L2 control signal including eSRS allocation information. For example, as shown in FIG. 6A, the eSRS allocation information may be included in the L1/L2 control signal (e.g., a UL grant) that instructs the transmission of the PUSCH. If the user terminal receives the L1/L2 control signal, the user terminal uses a radio resource that indicates the eSRS allocation information to transmit the eSRS, and uses a radio resource instructed by the UL grant to transmit the PUSCH.

Similarly, the eSRS allocation information may be included in the L1/L2 control signal (e.g., a DL assignment) that instructs the transmission of the PUCCH. As described above, since transmission via a PUCCH of the delivery acknowledgement information (HARQ-ACK) for the PDSCH, using the DL assignment, is required, it can be said that the DL assignment is a type of L1/L2 control signal for instructing the transmission of the uplink control signal. When the user terminal receives the L1/L2 control signal, the eSRS is transmitted using the radio resources indicated by the eSRS allocation information, and the PUCCH is used to transmit the delivery acknowledgement information.

Alternatively, as shown in FIG. 6B, the eSRS allocation information is provided separately from the UL grant and the DL assignment and may be included in the L1/L2 control signal (e.g., an eSRS grant) which instructs the transmission of the eSRS. When the user terminal receives the L1/L2 control signal, the user terminal uses the radio resources indicated by the eSRS allocation information to transmit the eSRS.

Fifth Embodiment

In the fifth embodiment, a description is given in regard to zero padding (ZP) of an eSRS. In the fifth embodiment, the user terminal receives ZP instruction information (instruction information) that instructs whether or not to apply zero padding on the radio resources allocated to the eSRS, and cancels the mapping (applies zero padding) to the resource elements of the eSRS. Similarly, if there is a PUSCH or PUCCH transmission, the mapping of the resource elements of the PUSCH or the PUSCH is cancelled (punctured) based on the ZP instruction information. Accordingly, interference with an eSRS from another user terminal can be reduced.

Figure 7A:
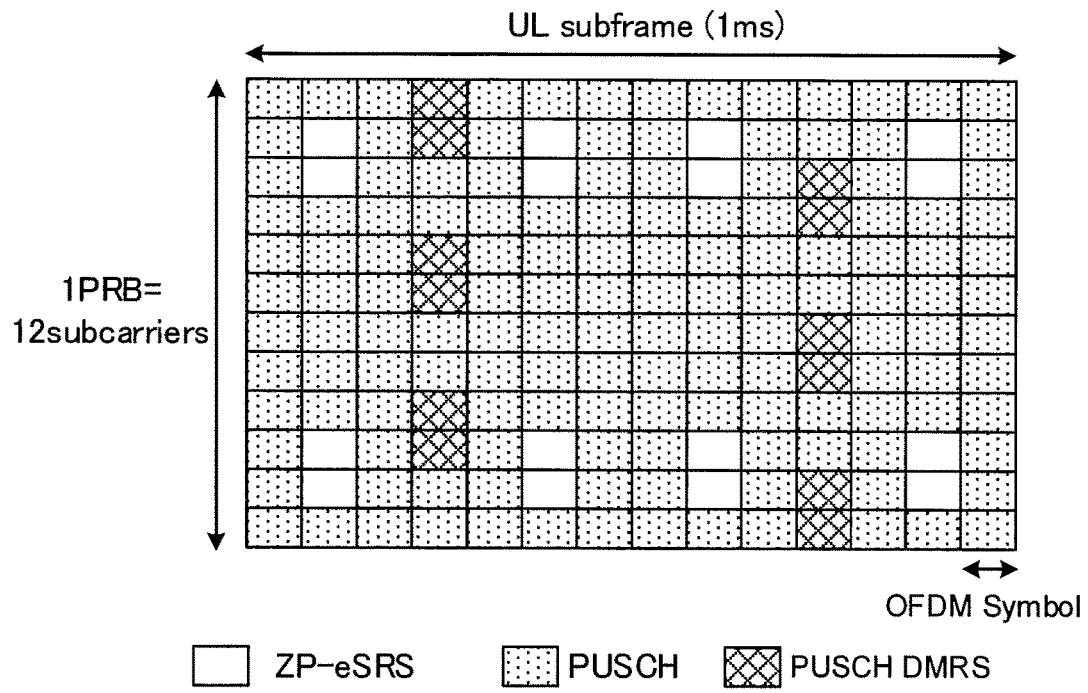
FIGS. 7A and 7B are explanatory diagrams of zero padding in an eSRS, pertaining to a fifth embodiment.

FIG. 7 is an explanatory diagram of eSRS zero padding. Note that in FIG. 7A, the eSRS allocation positions have the same pattern as that of FIG. 2B, however, they may have the same pattern as that of FIG. 2A, or have a pattern other than those of FIGS. 2A and 2B.

In FIG. 7A, the eSRS is not mapped to the allocation resources of the eSRS, but rather is zero-padded (ZP-eSRS: Zero Padded-eSRS). Accordingly, interference caused by the eSRS of the user terminal to an eSRS of another user terminal that is mapped to the same radio resources (resource elements) can be reduced.

Figure 7B:
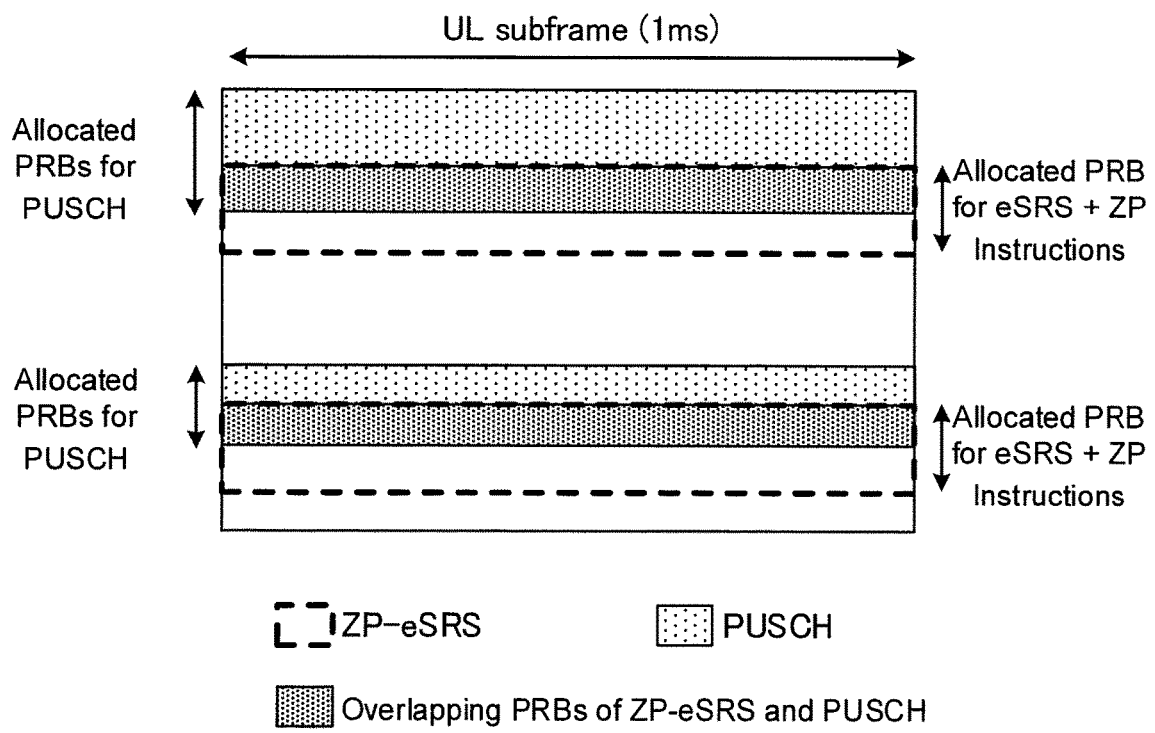

FIG. 7B shows an example of the allocated PRBs for the ZP-eSRS and the PUSCH in the system band. As shown in FIG. 7B, the allocated PRB for the ZP-eSRS may be different to the allocated PRB for the PUSCH. Furthermore, as shown in FIG. 7B, the allocated PRB for the ZP-eSRS may overlap with part of the allocated PRB for the PUSCH.

Figure 8A:
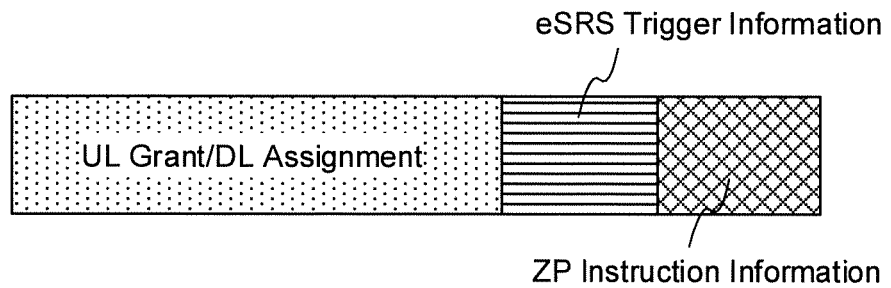
FIGS. 8A through 8C are illustrative diagrams of an eSRS zero padding notification example, pertaining to the fifth embodiment.

FIG. 8 is an explanatory diagram of an L1/L2 control signal including ZP instruction information. For example, if at least one candidate resource configured by higher layer signaling is triggered by the L1/L2 control signal (the first notification example), as shown in FIG. 8A, the ZP instruction information may be included in the UL grant or the DL assignment together with the trigger information.

Figure 8B:
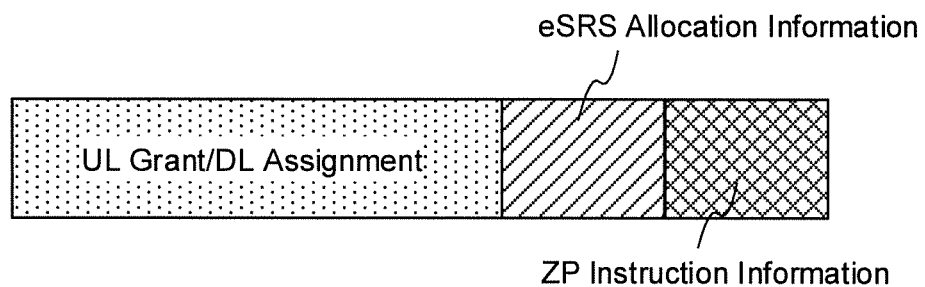

Alternatively, if the eSRS allocation information is included in the UL grant or the DL assignment (the second notification example; FIG. 6A), as shown in FIG. 8B, the ZP instruction information may be included in the UL grant or the DL assignment together with the eSRS allocation information.

Alternatively, in the case where the eSRS allocation information is included in the eSRS grant (the second notification example; FIG. 6B), as shown in FIG. 8C, the ZP instruction information may be included in the UL grant or the DL assignment.

Figure 8C:
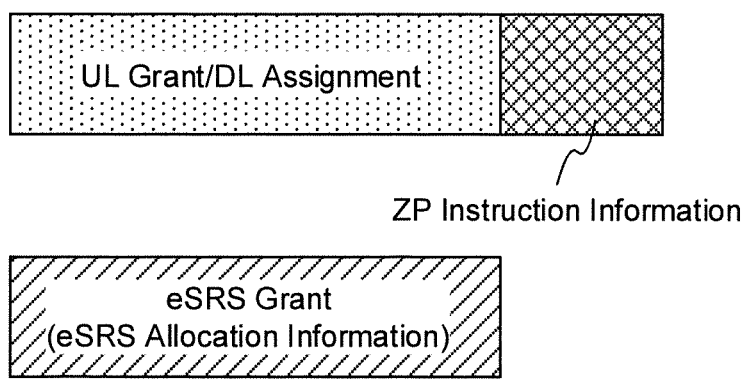

In the case shown in FIG. 8C, in which the ZP instruction information is included in the eSRS grant, if the detection of the eSRS grant is missed but the UL grant is detected, the user terminal ends up transmitting the eSRS without applying zero padding in the PUSCH radio resources. This results in the user terminal causing interference with an eSRS of another user terminal. Whereas, if the ZP instruction information is included in the UL grant or the DL assignment, such a problem can be avoided.

(Radio Communication System)

The following description concerns the configuration of a radio communication system according to an embodiment of the present invention. In this radio communication system, a radio communication method is adopted to which the above-described examples are applied. Furthermore, each communication method can be applied independently, or in combination.

Figure 9:
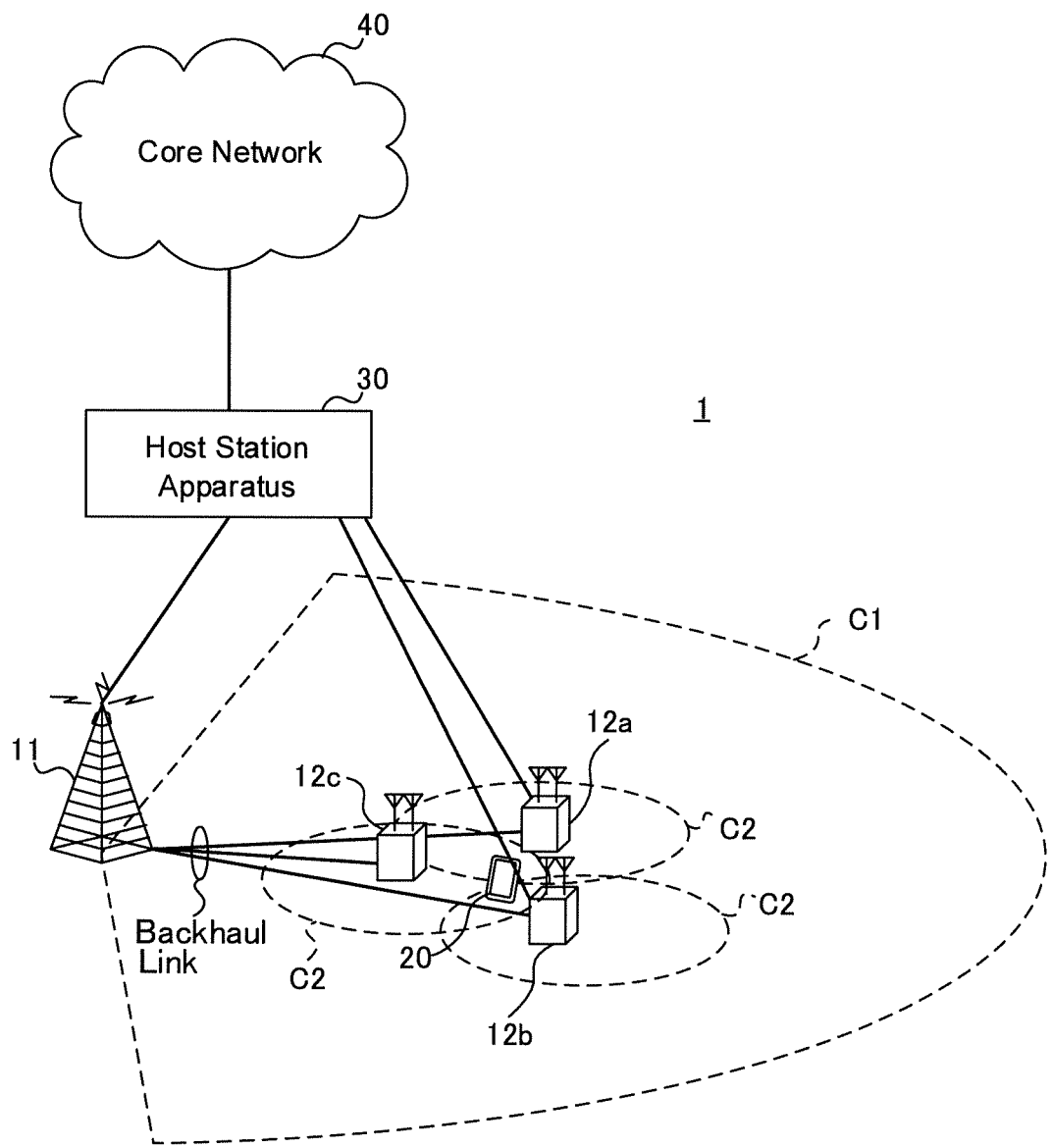
FIG. 9 is an illustrative diagram of a schematic configuration of a radio communication system of according to an illustrated embodiment of the present invention.

FIG. 9 shows an example of a schematic configuration of the radio communication system according to an embodiment of the present invention. The radio communication system 1 can apply carrier aggregation (CA) and/or dual connectivity (DC), which are an integration of a plurality of fundamental frequency blocks (component carriers), having the system bandwidth (e.g., 20 MHz) as 1 unit. Note that this radio communication system may also be called SUPER 3G, LTE-A (LTE-Advanced), IMT-Advanced, 4G, 5G, or FRA (Future Radio Access), etc.

The radio communication system 1 shown in FIG. 9 includes a radio base station 11 which forms a macro cell C1, and radio base stations 12a through 12c provided within the macro cell C1 and forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (CCs) (e.g., six or more CCs).

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station 12 (or between two radio base stations 12).

The radio base station 11 and each radio base station 12 are connected to a host station apparatus 30, and are connected to the core network 40 via the host station apparatus 30. The host station apparatus 30 includes, but is not limited to, an access gateway apparatus, a radio network controller (RNC), and a mobility management entity (MME), etc.

Furthermore, each radio base station 12 may be connected to the host station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished.

Each user terminal 20 is compatible with each kind of communication scheme such as LTE, LTE-A, etc., and also includes a fixed communication terminal in addition to a mobile communication terminal.

In the radio communication system 1, OFDMA (Orthogonal Frequency Division Multiple Access) is applied, as a radio access scheme, to both the downlink and the uplink. OFDMA is a multi-carrier transmission scheme for performing communication by dividing a frequency band into a plurality of narrow frequency bands (subcarriers) and mapping data to each subcarrier. Note that the uplink and downlink radio access schemes are not limited to these combinations. For example, SC-FDMA (Single-Carrier Frequency Division Multiple Access) may be applied to the uplink as a radio access scheme. SC-FDMA is a single carrier transmission scheme to reduce interference between terminals by dividing, per terminal, the system bandwidth into bands formed with one or continuous resource blocks, and allowing a plurality of terminals to use mutually different bands.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and an SIB (System Information Block) are transmitted on the PDSCH. Furthermore, an MIB (Master Information Block), etc., is transmitted on the PBCH.

The downlink L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. A HARQ delivery acknowledgement signal (ACK/NACK) for the PUSCH is transmitted by the PHICH. An EPDCCH that is frequency-division-multiplexed with a PDSCH (downlink shared data channel) can be used for transmitting the DCI in the same manner as the PDCCH.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Uplink control information (UCI) including at least one of delivery acknowledgement information (HARQ-ACK) and radio quality information (CQI), etc., is transmitted via the PUSCH or the PUCCH. A random access preamble for establishing a connection with a cell is transmitted by the PRACH.

<Radio Base Station>

Figure 10:
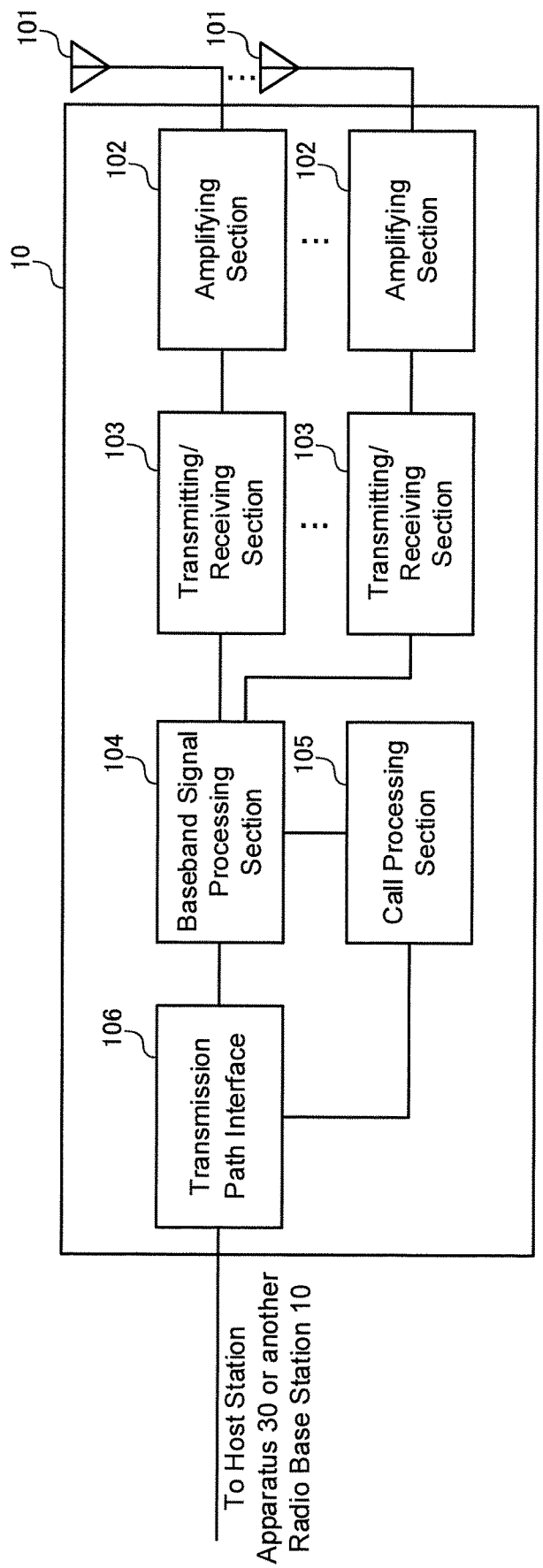
FIG. 10 is an illustrative diagram of an overall configuration of a radio base station according to the illustrated embodiment of the present invention.

FIG. 10 is a diagram illustrating an overall configuration of the radio base station according to the embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Note that the transmission/reception antennas 101, the amplifying sections 102 and the transmitting/receiving sections 103 may be configured to include more than one thereof, respectively.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

The transmitting/receiving sections 103 may transmit, via higher layer signaling, information that indicates at least one candidate resource. Furthermore, the transmitting/receiving sections 103 may transmit, by physical layer signaling, trigger information that triggers the radio resources selected from at least one candidate resource configured by higher layer signaling.

Furthermore, the transmitting/receiving sections 103 transmit eSRS allocation information that indicates the radio resources allocated to the eSRS. The eSRS allocation information may be included in an uplink grant which instructs the transmission of an uplink data signal, or a downlink assignment which instructs the transmission of an uplink control signal that includes delivery acknowledgement information for downlink data, or a grant which instructs the transmission of the measurement reference signal.

Furthermore, the transmitting/receiving sections 103 may transmit ZP instruction information, which instructs whether or not to apply zero padding to the radio resources allocated to the eSRS. The ZP instruction information may include an uplink grant which instructs the transmission of an uplink data signal, or a downlink assignment which instructs the transmission of an uplink control signal that includes delivery acknowledgement information for the downlink data signal.

Based on common recognition in the field of the art pertaining to the present invention, each transmitting/receiving section 103 can correspond to a transmitter/receiver, a transmitter/receiver circuit or a transmitter/receiver device. Note that each transmitting/receiving section 103 may be configured as an integral transmitting/receiving section, or can be configured as a transmitting second and a receiving section.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with a neighboring radio base station 10 via an inter-base-station interface (for example, optical fiber or X2 interface compliant with CPRI (Common Public Radio Interface)).

Figure 11:
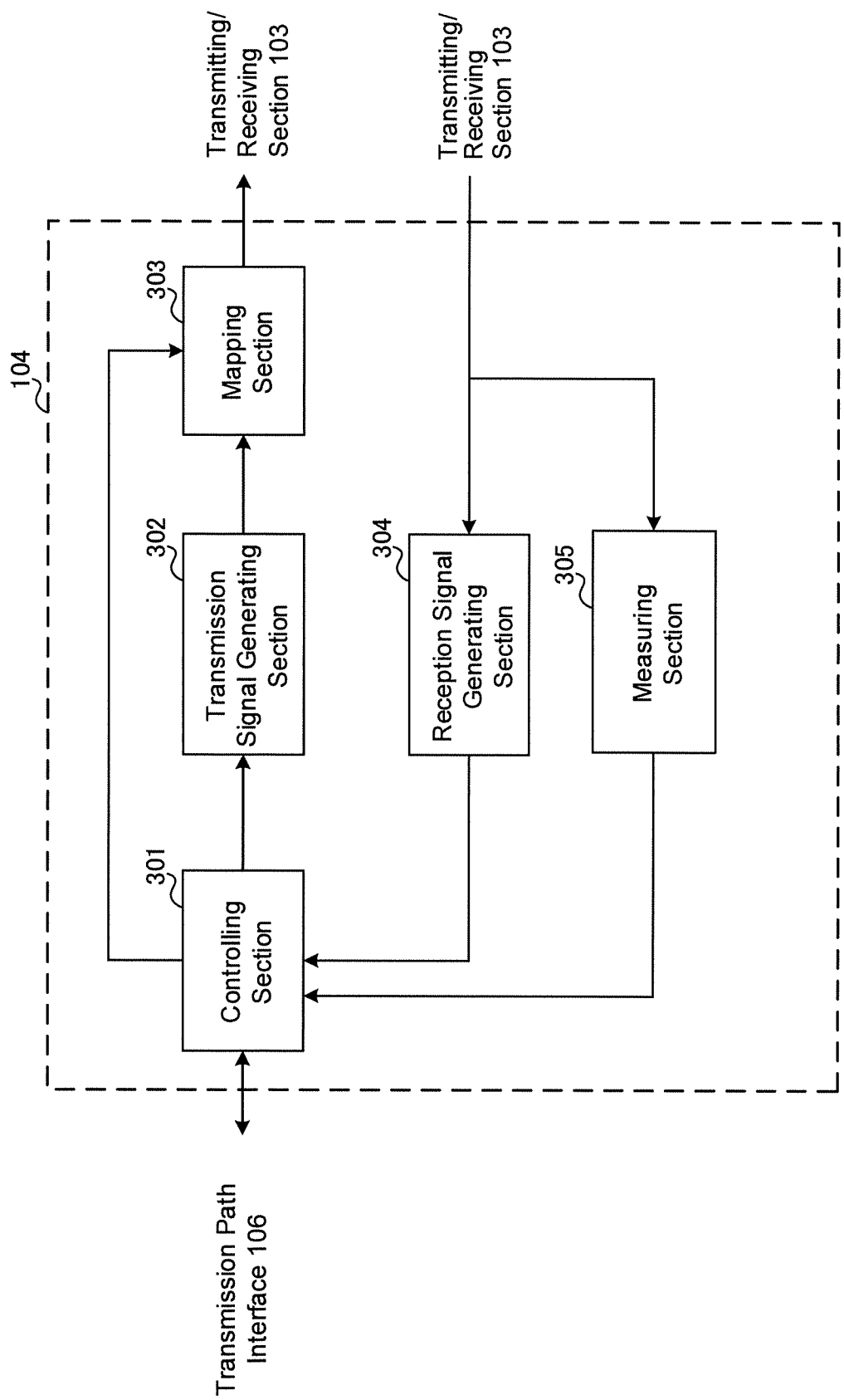
FIG. 11 is an illustrative diagram of a functional configuration of the radio base station according to the illustrated embodiment of the present invention.

FIG. 11 is a diagram illustrating the functional configurations of the radio base station according to the present embodiment. Note that although FIG. 11 mainly shows functional blocks of the features of the present embodiment, the radio base station 10 is also provided with other functional blocks that are necessary for carrying out radio communication. As illustrated in FIG. 11, the baseband signal processing section 104 includes a control section 301, a transmission signal generating section 302, a mapping section 303, a reception signal processing section 304, and a measuring section 305.

The control section 301 performs the control of the entire radio base station 10. The control section 301 controls, for example, the generation of the downlink signals via the transmission signal generating section 302, the mapping of signals via the mapping section 303, and the receiving process of signals via the reception signal processing section 304.

Specifically, the control section 301 carries out the transmission control (e.g., control of the modulation scheme, coding rate, resource allocation (scheduling), etc.) of the downlink (DL) signal based on the channel state information (CSI) reported from the user terminal 20.

Furthermore, the control section 301 may carry out a downlink beam control applied to FD-MIMO, based on a measurement result that uses an eSRS (measurement reference signal) in the measuring section 305.

Based on common recognition in the field of the art pertaining to the present invention, the control section 301 can correspond to a controller, a control circuit or a control device.

The transmission signal generating section 302 generates a DL signal (including downlink data signals and downlink control signal) based on instructions from the control section 301, and outputs the generated signal to the mapping section 303. Specifically, the transmission signal generating section 302 generates a downlink data signal (PDSCH) including notification information and user data via the above-described higher layer signaling, and outputs the generated signal to the mapping section 303. Furthermore, the transmission signal generating section 302 generates a downlink control signal (PDCCH/EPDCCH) including the aforementioned DCI, and is output to the mapping section 303. Furthermore, the transmission signal generating section 302 generates a downlink reference signal, such as a CRS, or a CSI-RS, etc., and outputs this signal to the mapping section 303.

Based on common recognition in the field of the art pertaining to the present invention, the downlink control signal generating section 302 can correspond to a signal generator or a signal generating circuit.

Based on instructions from the control section 301, the mapping section 303 maps the DL signal generated in the transmission signal generating section 302 to predetermined radio resources to output to the transmitting/receiving sections 103. Based on common recognition in the field of the art pertaining to the present invention, the mapping section 303 can correspond to a mapping circuit and a mapper.

The reception signal processing section 304 performs a receiving process (e.g., demapping, demodulation, and decoding, etc.) on the UL signal transmitted from the user terminal 20. The result of this process is output to the control section 301.

Based on common recognition in the field of the art pertaining to the present invention, the reception signal processing section 304 can correspond to a signal processor, a signal processing circuit, or a signal processing device; or can be configured as a measurer, a measuring circuit or a measuring device.

The measuring section 305 can measure, using the reference signals (e.g., an existing SRS, or an eSRS) from the user terminal 20, and output the measurement result to the control section 301. Specifically, the measuring section 305 measures the uplink propagation quality, or the downlink channel state, utilizing channel reciprocity, by using an eSRS (measurement reference signal) transmitted from a user terminal 20, to which UL-OFDMA is applied.

Based on common recognition in the field of the art pertaining to the present invention, the measuring section 305 can correspond to a signal processor, a signal processing circuit, or a signal processing device; or can be configured as a measurer, a measuring circuit or a measuring device.

<User Terminal>

Figure 12:
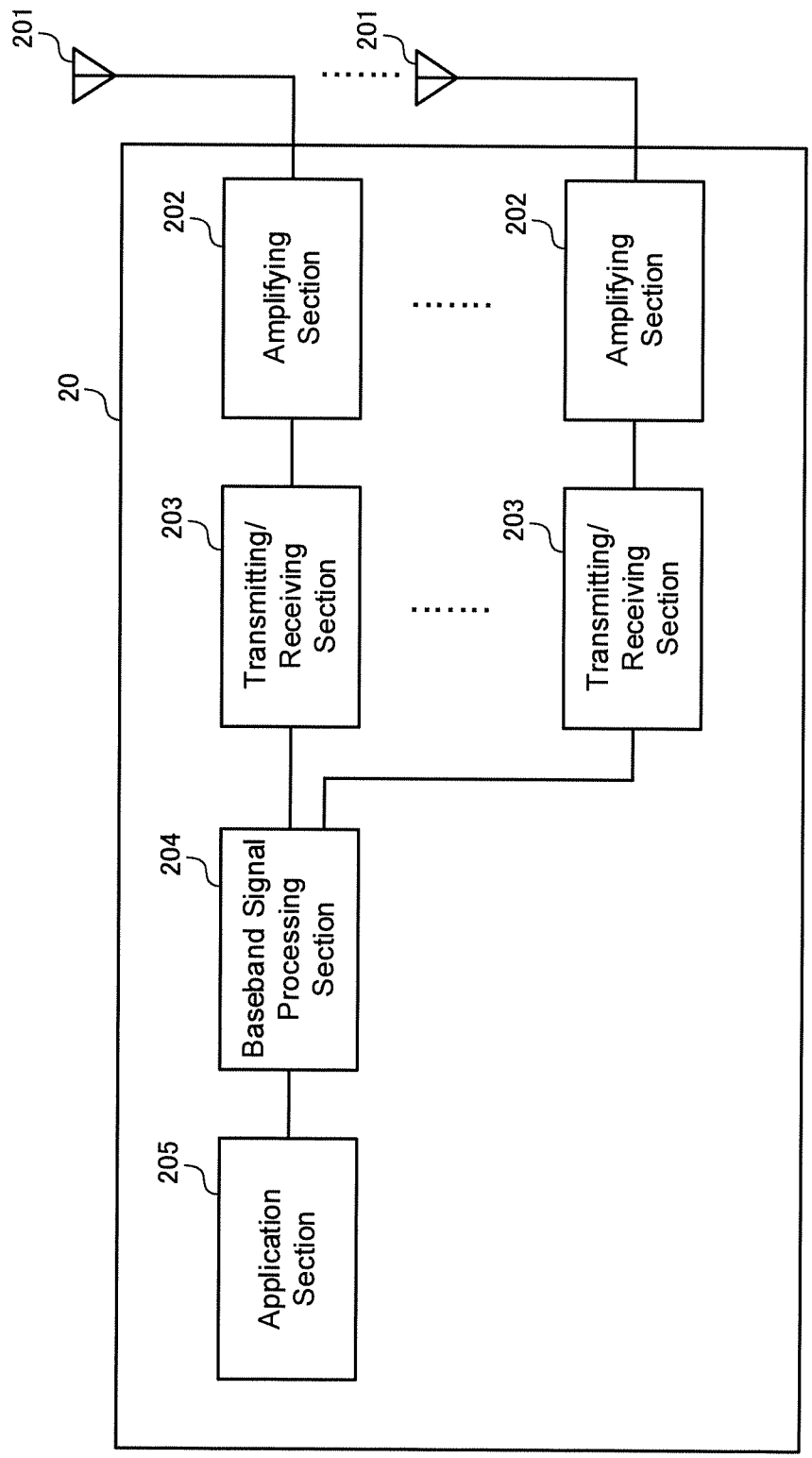
FIG. 12 is an illustrative diagram of an overall configuration of a user terminal according to the illustrated embodiment of the present invention.

FIG. 12 is a diagram showing an overall structure of a user terminal according to the present embodiment. The user terminal 20 is provided with a plurality of transmitting/receiving antennas 201 for MIMO communication, amplifying sections 202, transmitting/receiving sections 203, a baseband signal processing section 204 and an application section 205.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Note that the transmitting/receiving sections 203 may receive trigger information that triggers the radio resources selected from at least one candidate resource configured by higher layer signaling (FIG. 5). The trigger information may include an uplink grant which instructs the transmission of an uplink data signal, or a downlink assignment which instructs the transmission of an uplink control signal that includes delivery acknowledgement information for the downlink data signal.

Furthermore, the transmitting/receiving sections 203 may receive eSRS allocation information (allocation information) indicating the radio resources that are allocated to the eSRS (FIG. 6). The eSRS allocation information is included in an uplink grant which instructs the transmission of an uplink data signal, or a downlink assignment which instructs the transmission of an uplink control signal that includes delivery acknowledgement information for downlink data, or a grant which instructs the transmission of the measurement reference signal.

Furthermore, the transmitting/receiving sections 203 may receive ZP instruction information (instruction information) that instructs whether or not to apply zero padding on the radio resources allocated to the eSRS (FIG. 8). The ZP instruction information may include an uplink grant which instructs the transmission of an uplink data signal, or a downlink assignment which instructs the transmission of an uplink control signal that includes delivery acknowledgement information for the downlink data signal.

Based on common recognition in the field of the art pertaining to the present invention, each transmitting/receiving section 203 can correspond to a transmitter/receiver, a transmitter/receiver circuit or a transmitter/receiver device. Furthermore, each transmitting/receiving section 203 may be configured of an integral transmitting/receiving section, or configured as a transmitting section and a receiving section.

Figure 13:
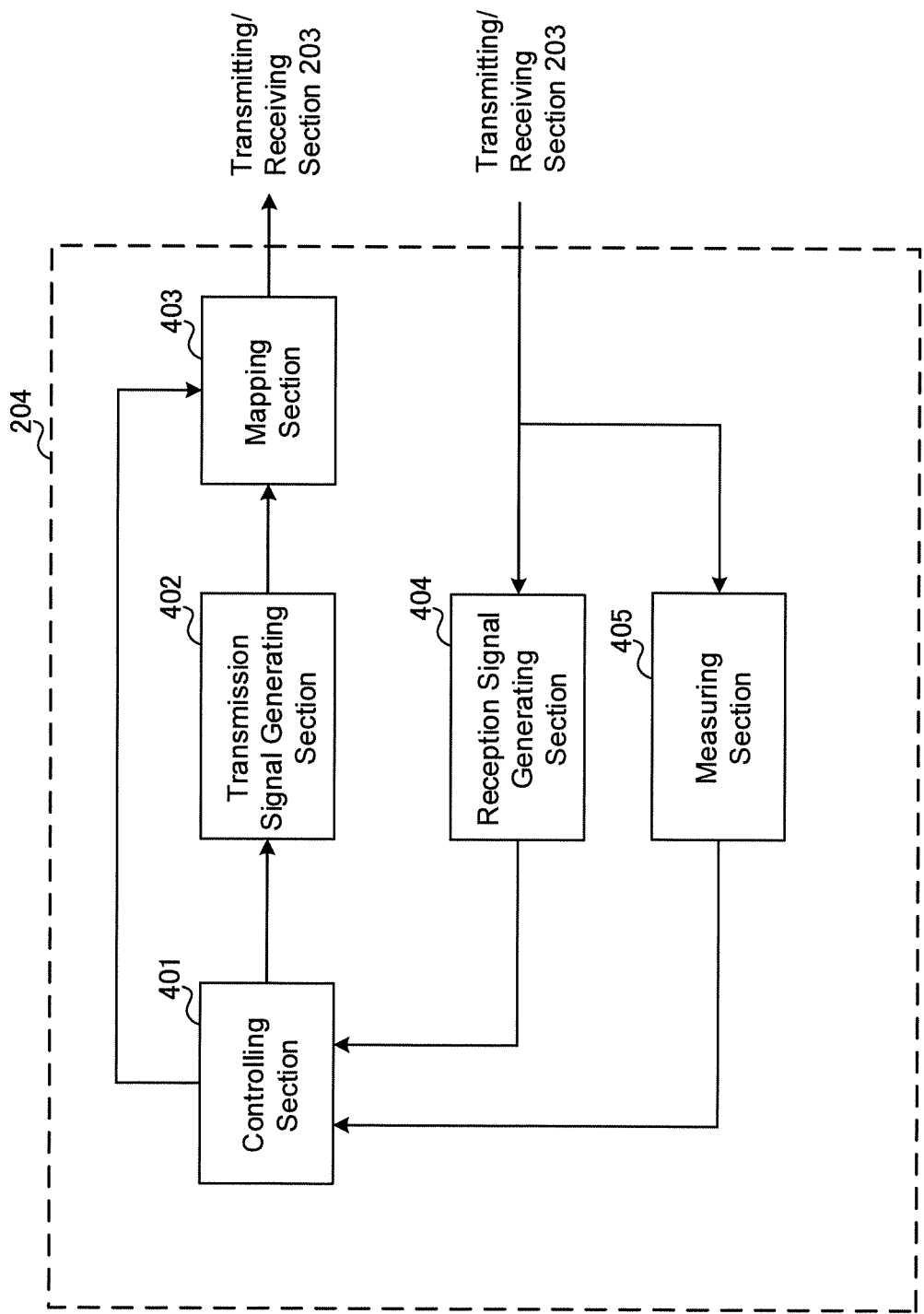
FIG. 13 is an illustrative diagram of a functional configuration of the user terminal according to the illustrated embodiment of the present invention.

FIG. 13 is a diagram illustrating the functional configurations of the user terminal according to the present embodiment. Note that FIG. 13 mainly shows functional blocks of the features of the present embodiment; the user terminal 20 is also provided with other functional blocks that are necessary for carrying out radio communication. As illustrated in FIG. 13, the baseband signal processing section 204 provided in the user terminal 20 includes a control section 401, a transmission signal generating section 402, a mapping section 403, a reception signal processing section 404, and a measuring section 405.

The control section 401 carries out the control of the entire user terminal 20. The control section 401 controls, e.g., the signal generation performed by the transmission signal generating section 402, the signal mapping performed by the mapping section 403, and the reception processes performed by the reception signal processing section 404.

Specifically, the control section 401 controls the mapping section 403 to map the eSRS to discontinuous radio resources in the time direction and/or in the frequency direction. The control section 401 performs a control so that the eSRS is mapped over all the subcarriers within a PRB. Specifically, the control section 401 may perform a control to map the eSRS to subcarriers that are shifted between OFDM symbols (FIG. 2A).

Alternatively, the control section 401 performs a control to map the eSRS to subcarriers of part of the PRB in specified OFDM symbols (FIG. 2B).

Furthermore, the control section 401 performs a control to map the eSRS and a PUSCH or a PUCCH into the same OFDM symbols (FIGS. 3 and 4). In this case, the control section 401 may control the transmission signal generating section 402 to carry out puncturing or rate-matching of the PUSCH or the PUCCH based on the allocated resources of the eSRS.

Furthermore, the control section 401 may perform a control to map the eSRS to radio resources triggered by trigger information received by the transmitting/receiving sections 203 (FIG. 5). Alternatively, the control section 401 may perform a control to map the eSRS to radio resources indicated by eSRS allocation information received by the transmitting/receiving sections 203 (FIG. 6).

Furthermore, the control section 401 may cancel (apply zero padding) the mapping of the eSRS to the radio resources indicated by the eSRS allocation information based on the ZP instruction information received by the transmitting/receiving sections 203.

Based on common recognition in the field of the art pertaining to the present invention, the control section 401 can correspond to a controller, a control circuit or a control device.

The transmission signal generating section 402 generates UL signals (including an uplink data signal and a uplink control signal) based on instructions from the control section 401, and outputs these UL signals to the mapping section 403. For example, the transmission signal generating section 402 generates an uplink control signal (PUCCH), including a UCI (at least one of a HARQ-ACK, a CQI and an SR).

Specifically, the transmission signal generating section 402 generates an eSRS (measurement reference signal) used for measurement in the radio base station 10. Specifically, the transmission signal generating section 402 may generate an eSRS sequence by using a CAZAC (Constant Amplitude Zero Auto-Correlation) sequence in the same manner as an existing SRS, or may generate an eSRS sequence using a sequence other than that of a CAZAC sequence.

For example, the transmission signal generating section 402 may generate, as an eSRS sequence, a sequence generated by masking a PN (Pseudo-Noise) sequence with a cell ID or a pseudo cell ID, or generate a sequence that is PSK (Phase Shift Keying) modulated (e.g., a BPSK (Binary PSK) or QPSK (Quadrature PSK)).

Based on common recognition in the field of the art pertaining to the present invention, the transmission signal generating section 402 can correspond to a signal generator, a signal generating circuit, or a signal generating device.

The mapping section 403 maps the UL signal (uplink control signal, uplink data signal, eSRS, SRS, etc.) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., demapping, demodulation, decoding, etc.) on the DL signal (including a downlink control signal and a downlink data signal). The reception signal processing section 404 outputs the information received from the radio base station 10 to the control section 401. The reception signal processing section 404 outputs control information and a DCI, etc., to the control section 401 via higher layer signaling, such as, e.g., broadcast information, system information, or RRC signaling, etc.

Based on common recognition in the field of the art pertaining to the present invention, the reception signal processing section 404 can correspond to a signal processor, a signal processing circuit, or a signal processing device. Furthermore, the reception signal processing section 404 can be configured as a receiving section pertaining to the present invention.

The measuring section 405 measures the channel state based on a reference signal (e.g., a CSI-RS) from the radio base station 10, and outputs the measurement result to the control section 401. Note that measurement of the channel state may be carried out for each CC.

Based on common recognition in the field of the art pertaining to the present invention, the measuring section 405 can correspond to a signal processor, a signal processing circuit, or a signal processing device; or can be configured as a measurer, a measuring circuit or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio communication system and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads a programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long no contradictions occur. For example, each method described in the present specification proposes an example of an order of various steps but are not limited to the specified order thereof.

Hereinabove, the present invention has been described in detail by use of the foregoing embodiments. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The disclosure of Japanese Patent Application No. 2015-164187, filed on Aug. 21, 2015, is incorporated herein by reference in its entirety.

The invention claimed is:

1. A terminal comprising:
    a processor that configures, based on higher layer signaling, a plurality of candidate resources, each corresponding to one of
        a first mapping that maps a given number of sounding reference signals in one resource block in a frequency direction, and
        a second mapping that maps a number of the sounding reference signals that is less than the given number of the sounding reference signals in the one resource block in the frequency direction; and
    a transmitter that transmits the sounding reference signals based on the candidate resources,
    wherein information on an identifier used in a generation of a sequence of the sounding reference signals is notified by higher layer signaling from a base station, and
    wherein the processor determines, based on information about resource allocation of the sounding reference signals, whether to transmit the sounding reference signals using different subcarriers in a plurality of symbols or to transmit the sounding reference signals using same subcarriers in a plurality of symbols.

2. The terminal according to claim 1, wherein the processor selects a resource for transmission of the sounding reference signals based on information included in a downlink control signal.

3. A base station comprising:
    a processor that transmits to higher layer signaling to configure a plurality of candidate resources, each corresponding to one of
        a first mapping that maps a given number of sounding reference signals in one resource block in a frequency direction, and
        a second mapping that maps a number of the sounding reference signals that is less than the given number of the sounding reference signals in the one resource block in the frequency direction for a terminal; and
    a receiver that receives the sounding reference signals transmitted based on the candidate resources configured by the terminal,
    wherein information on an identifier used in a generation of a sequence of the sounding reference signals is notified by higher layer signaling to the terminal, and
    wherein the terminal determines, based on information about resource allocation of the sounding reference signals, whether to transmit the sounding reference signals using different subcarriers in a plurality of symbols or to transmit the sounding reference signals using same subcarriers in a plurality of symbols.

4. A radio communication method for a terminal comprising:
    configuring, based on higher layer signaling, a plurality of candidate resources, each corresponding to one of
        a first mapping that maps a given number of sounding reference signals in one resource block in a frequency direction, and
        a second mapping that maps a number of the sounding reference signals that is less than the given number of the sounding reference signals in the one resource block in the frequency direction; and
    transmitting the sounding reference signals based on the candidate resources,
    wherein information on an identifier used in a generation of a sequence of the sounding reference signals is notified by higher layer signaling from a base station, and
    wherein the terminal determines, based on information about resource allocation of the sounding reference signals, whether to transmit the sounding reference signals using different subcarriers in a plurality of symbols or to transmit the sounding reference signals using same subcarriers in a plurality of symbols.

5. A system comprising a terminal and a base station, wherein:
    the base station comprises:
        a processor of the base station that transmits to higher layer signaling to configure a plurality of candidate resource, each corresponds to one of
            a first mapping that maps a given number of sounding reference signals in one resource block in a frequency direction, and
            a second mapping that maps a number of the sounding reference signals that is less than the given number of the sounding reference signals in the one resource block in the frequency direction for the terminal; and a receiver that receives the sounding reference signals transmitted based on the candidate resources configured by the terminal, the terminal comprises:
a processor of the terminal that configures, based on the higher layer signaling, the candidate resources; and
a transmitter that transmits the sounding reference signals based on the candidate resources, wherein information on an identifier used in a generation of a sequence of the sounding reference signals is notified by higher layer signaling from the base station to the terminal, and wherein the processor of the terminal determines, based on information about resource allocation of the sounding reference signals, whether to transmit the sounding reference signals using different subcarriers in a plurality of symbols or to transmit the sounding reference signals using same subcarriers in a plurality of symbols.

* * * * *